ABSORPTION AT 2.93 MICRONS VS RELATIVE HUMIDITY OVER A TEMPERATURE RANGE OF +30°C TO -30°C

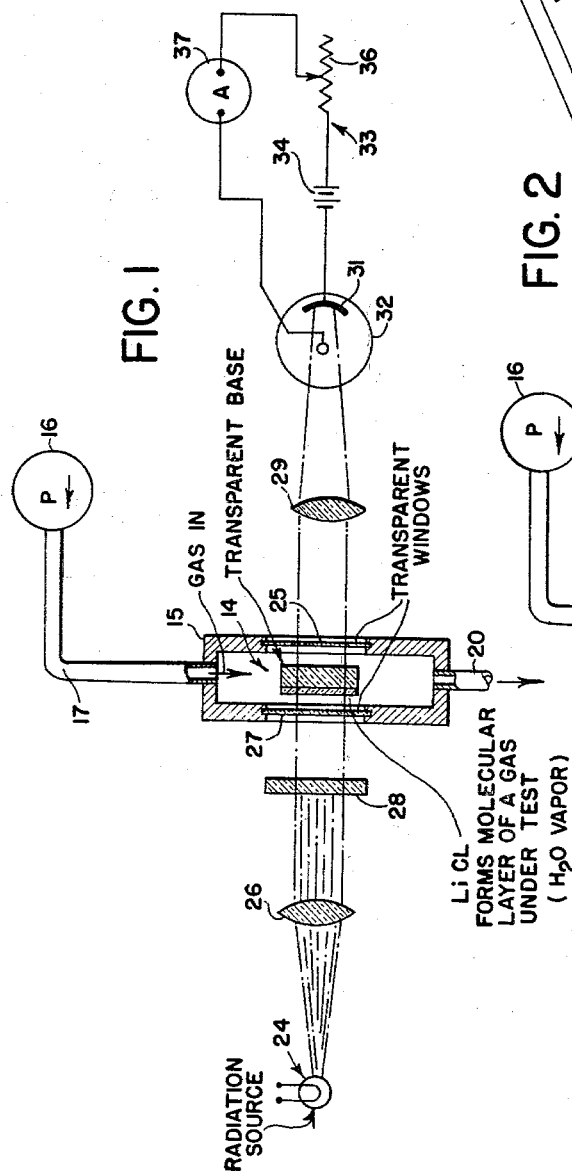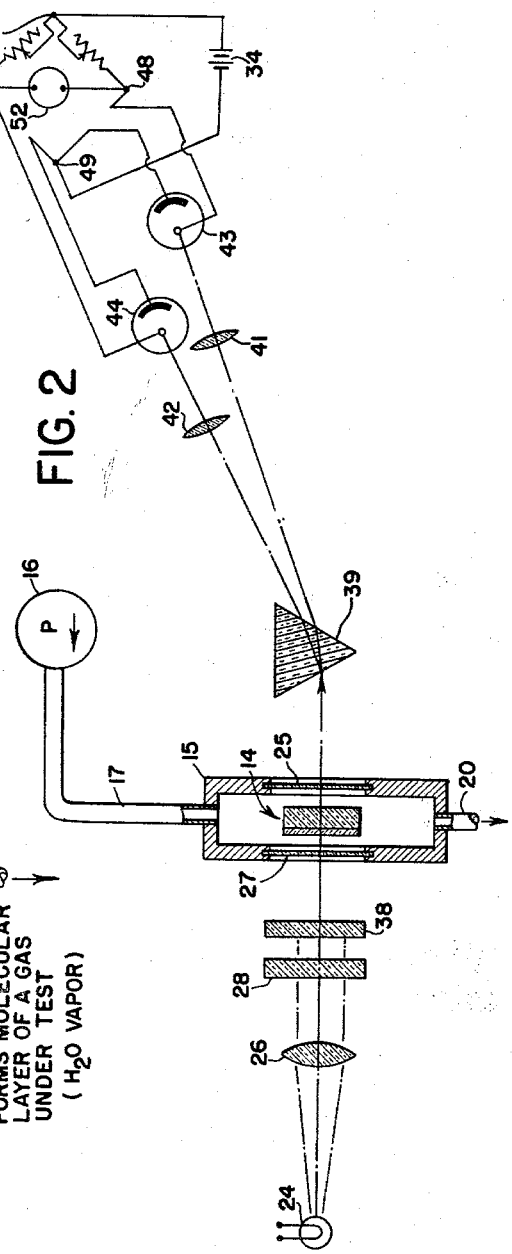

United States Patent Office 3,174,037
Patented Mar. 16, 1965

3,174,037
METHOD AND APPARATUS FOR MEASURING THE CONCENTRATION OF A GAS IN A MIXTURE OF GASES
Howard L. Demorest, Minneapolis, and Rex C. Wood, New Brighton, Minn., assignors, by mesne assignments, to Litton Systems, Inc., Beverly Hills, Calif., a corporation of Maryland
Filed May 28, 1962, Ser. No. 198,171
14 Claims. (Cl. 250—43.5)

This invention relates to apparatus and method of measuring the concentration of a gas in a mixture of gases and more particularly to methods of an apparatus for measuring the concentration of a gas in a mixture of gases by determining the attenuation of electromagnetic radiation.

Engineers, scientists, and industry have had a need and will continue to have a need for controlled environments where a precise knowledge of the gases making up a mixture of gases must be known. Precise knowledge of the concentration of the constituents making up a particular atmosphere is needed for industrial purposes especially where the industry is concerned with producing precision parts which require a freedom from contamination of gases such as water vapor, carbon dioxide or the like. Often the manufacture of precision electronic parts requires an atmosphere which contains very little humidity since a high concentration of water vapor in the air will often lead to failure of the assembled electronic components in the field.

Another example of the situation where a precise knowledge of the gaseous constituents of the atmosphere is needed is the situation where human subjects are confined in a closed room or similar environment which is continually being contaminated to some extent by toxic gases. A precise knowledge of the concentration of a toxic gas is necessary in order to provide safety precautions for the human occupants of the enclosed space. The detection device must be capable of accurate, continuous operation to provide a quantitative indication of the amount of toxic gas in the air.

Aside from the aforementioned needs, there is the continual need for humidity detecting devices which are capable of detecting, with a high degree of accuracy, the relative humidity of a particular body of air whether it be from an enclosed space such as a room or from the atmosphere.

With the need to know the precise make-up of the atmosphere of a particular environment is the need to have instruments capable of measuring the constituents of a mixture of gases which occur in the particular environment. Instruments capable of measuring the concentration of the gases must conform to certain standards. The instruments must be capable of precise measurement of the constituent which is to be detected, the instrument must be capable of being placed in the environment which is to be monitored, and the instrument must be adequately rugged and serviceable to perform the testing or measuring function for extended periods of time.

It is therefore an object of the present invention to provide a new and improved method and apparatus for measuring the concentration of a gas in a mixture of gases.

It is another object of the invention to provide a new and improved apparatus and method of measuring the concentration of a gas in a mixture of gases by determining the attenuation of electromagnetic radiation.

Another object of the present invention is to provide a method and apparatus for measuring the concentration of a gas in a mixture of gases by utilizing the characteristics of gases to absorb particular wave lengths of electromagnetic radiation.

A further object of the invention is to provide a new and improved method and apparatus for measuring the concentration of a gas in a mixture of gases by collecting a layer or film of the gas on a substrate which layer has a thickness which is a function of the concentration of the gas in the atmosphere and then measuring the thickness of the collected layer by utilizing electromagnetic radiation of a particular wave length.

Another object of the present invention is to provide a method and apparatus for collecting a layer of a gaseous constituent of a mixture of gas, the thickness of which varies with the concentration of the constituent in the mixture at a constant temperature and measuring the thickness of the layer by using electromagnetic radiation.

Another object of the present invention is to provide a new and improved apparatus and method for determining relative humidity by collecting a film of water having a thickness which is a function of the concentration of water vapor in a particular body of air.

With these and other objects in view the present invention contemplates a sensing device which may include a base material such as glass which has a gas collecting material on one surface. The gas collecting material is capable of collecting a layer of the gas which is to be measured. The base material with the overlying substrate is then placed in the environment where the measurement of a gas is to take place. A beam of electromagnetic radiation from a source of radiation is then cast upon the substrate and base material. If the base material is a transparent material, the radiation penetrates the base and passes to a detector such as a photocell which is situated behind the base material. A mixture of carrier gases containing the gas to be detected is directed past the base material and substrate so that a film or layer of the gas which is measured is collected on the substrate. A filter or similar device is utilized to select a radiation wave length or frequency, preferably a wave band, which is highly attenuated by the layer of the particular gas which is being measured. The attenuated radiation is then detected by the photocell or other detection device and the attenuation is directly related to the concentration of the measured gas in the mixture of gases which is flowing past the base material and substrate. The attenuation of the electromagnetic radiation is thus utilized to indicate the concentration of the measured gas in the atmosphere or in the mixture of carrier gases.

A complete understanding of the invention may be obtained from the following detailed description of a method and an apparatus forming specific embodiments, when read in conjunction with the drawings, in which;

FIGURE 1 is a schematic view of the invention showing a base material and substrate situated in a jacket through which a source of electromagnetic radiation is directed to a photocell;

FIGURE 2 is a modification of the apparatus disclosed in FIGURE 1 wherein two wave lengths of radiation are utilized to determine the precise thickness of a layer of collected gas;

Figure 4:
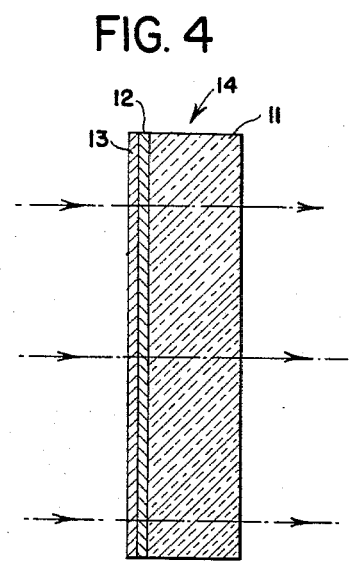
FIGURE 4 is a cross section of a transparent base material with a substrate of moisture or gas collecting material on one surface thereof.

Refer first to FIGURE 4 of the drawings where there is shown a cross section of a base material 11 with a substrate 12 deposited or affixed to one surface of the base 11. Selection of the base material 11 and substrate 12 is dependent upon the particular gas which is to be measured by the apparatus. Base material 11 is selected so that it is transparent or reflective of the particular wave length of electromagnetic radiation which is to be utilized to measure the thickness of the layer or film 13 of gas which is collected by the substrate 12. Whether transparent or reflective material is utilized will depend on the physical configuration selected for the apparatus. The description and the particular materials selected for the purposes of illustrating the principles of this invention are those utilized for detecting the concentration of water vapor in air as is the preferred embodiment, however the same principles which are utilized to collect and measure the concentration of water vapor may also be utilized for the detection and measurement of other gases such as carbon dioxide and many toxic gases. It is to be understood that the use of water vapor as the gas disclosed in this specification is merely illustrative of the principles involved in the invention and should not be construed as limited thereto.

If the gas which is to be measured is water vapor, the base 11 may be glass or some other material which is transparent to infrared radiation of the wave lengths of about 2.50 to 3.0 microns. Glass is an example of a material which could be utilized as a transparent base 11. If the gas to be measured is to be $CO_2$ then a different material for base 11 may be chosen depending on the frequency of radiation which is highly attenuated by a collected layer of $CO_2$ gas and by the physical configuration of the apparatus, reflective or transparent.

A number of substrate materials can be used for the collecting substrate 12, an example of such material is lithium chloride which has often been used to collect moisture in a standard resistive type humidity measuring device. The lithium chloride is attached to the base material 11 by some type of adhesive material. A preferred embodiment will include a substrate 12 which is capable of collecting a molecular layer or film of the gas to be measured. A molecular layer is not absolutely necessary to the efficient operation of the device. The layer may be more or less than a molecular layer. The material 11, can be of the type which adsorbs the gas, in other words collects a layer of the gas on the surface of material 11. It may also be of the type that absorbs the gas or traps the molecules of gas in a layer in the molecular structure of the material 11. Either type of material 11 can be used provided the material 11 forms the necessary layer of the gas. For the purpose of discussing both types of material, the word sorbent will mean both types of material.

The cell 14 is then placed inside a jacket 15 through which a flow of the carrier gas containing the gas to be measured such as water vapor is conducted past cell 14. If the relative humidity of a room is to be measured, a pump 16 is utilized to collect air from the room and direct the air through a conduit 17 into jacket 15 past cell 14 and may be discharged from jacket 15 through conduit 20. It should be noted at this time that the substrate material 12 which is utilized to collect the gas such as water vapor must be a material which will release the particular collected gas to the carrier gas as well as collect the gas to be measured depending upon the particular concentration of the measured gas in the carrier gas. In other words the collection of the gas to be measured must be a reversible process in order that the device can be utilized to continuously monitor and determine the relative concentration of the gas in the mixture of gases if the concentration should vary from time to time. In the case of determining the relative humidity of the air in a room, the relative humidity may change from time to time depending upon the work which is being conducted in the room or by other factors which may affect the concentration of moisture in the air. If the process of collecting a layer of the gas were not reversible, no continuous monitoring of the relative humidity could be conducted since the collecting substrate 12 would simply collect an amount of moisture or other gas necessary to saturate the collecting substrate 12 and thus reduce the accuracy or destroy completely the ability of the entire measuring apparatus to give a continuous indication of the relative concentration of a particular gas in the carrier gas.

The cell 14 is placed in a jacket 15 so that the carrier gas can be directed past the cell however if the natural circulation in a particular environment is adequate, no additional artificial circulating device such as pump 16 is needed. Also if the atmosphere of the environment is physically confined to a small area, then a gas circulating apparatus is not necessary for satisfactory monitoring of the gases in the environment since the area of cell 14 may be large in relation to the physical volume of the environment thus providing a sufficiently accurate indication of the concentration of a measured gas.

Other factors must be maintained relatively constant in order that the device may provide satisfactory measurement of the concentration of moisture or other gas in a carrier gas such as air. A factor which must be known or at least maintained reasonably constant is the temperature of the substrate 12 and base 11. Since the sorption (absorption or adsorption) characteristics of a substrate 12 such as lithium chloride and many other similar materials varies in accordance with temperature, which changes the partial pressure of a gas or water vapor, the temperature of the substrate 12, base 11, and carrier gas are maintained relatively constant to insure an accurate indication of the concentration of gas or water vapor in the carrier gas. If the base material 11 or the substrate 12 varies from time to time in temperature, the amount of gas or water which is collected to form layer 13 will vary somewhat as the temperature varies, consequently introducing an error into the measurement of the thickness of the layer of gas 13. Increasing the temperature of the substrate 12 will reduce the thickness of the collected layer of water for a particular concentration of water vapor in the air.

Figure 3:
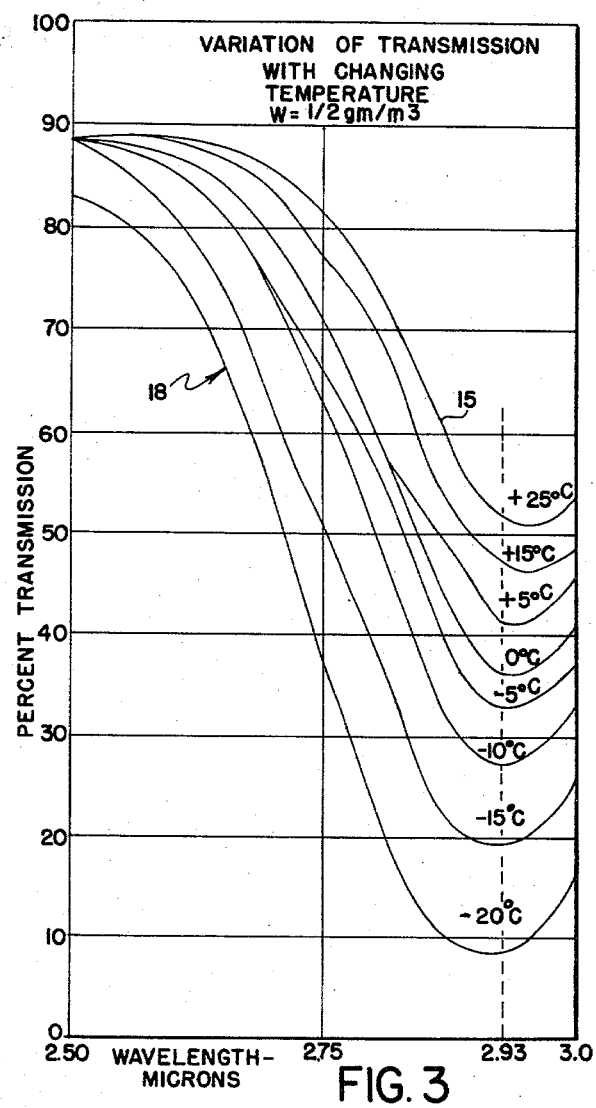
FIGURE 3 is a graph with the percentage of transmission of radiation through a layer of water plotted against particular wave lengths of radiation, measured in microns, for a number of temperature conditions and with water vapor concentration of the air or carrier gas maintained at .5 gr./m.$^3$.

Now refer to FIGURE 3 which is a graph with percentage of transmission of electromagnetic radiation, in this case infrared radiation, through a layer of water plotted against wave lengths measured in microns. Experiments have shown that the amount of electromagnetic radiation which is absorbed by water vapor which is on the surface of a substrate 12 is frequency or wave length dependent. If infrared radiation of a wave length of 2.5 microns is transmitted through a layer of water vapor 13 which is collected on the surface of lithium chloride, the curve 18 illustrates that approximately 83 percent or more of the energy will be transmitted through the layer of water 13 when the concentration of the water vapor layer 13 is ½ gm./m.³. If infrared radiation of about 2.88 microns to 2.95 microns in wave length is cast upon the layer of water vapor 13 in FIGURE 4, as little as 10 percent or less of the transmitted energy passes through the layer 13. From this information it is apparent that the layer of water vapor 13 is nearly opaque as far as this range of radiation is concerned. On investigation of the entire set of curves including the curve for temperatures of +25° C. to −20° C., it is noted that line 21 drawn through the average lowest point of all the curves falls at about the 2.93 micron wave length point on the graph. In other words it has been found that a radiation wave length of about 2.93 microns is the optimum wave length of radiation which can be used for determining the thickness of a layer of water vapor 13 since it is the most highly attenuated by a given thickness of the layer of water. Radiation of about 2.93 microns wave length is highly attenuated by a layer of water vapor 13 and the transmitted percent of the total power has been found to vary directly with the thickness of the layer 13. Since an exact wave length is very difficult to isolate, a wave band of about 2.88 to 2.95 microns is preferably used in actual practice. The radiation that is transmitted through the layer 13 and the base 11 if a transparent base is used, is then a direct indication of the thickness of the layer of water 13 on the substrate 12. Each of the curves in the FIGURE 3 at the various temperatures contains a sharp drop in the percentage of transmission of radiation in the 2.88 to 2.95 microns wave band. Beyond the 2.88 to 2.93 micron wave band, the curves each again begin to rise which again illustrates that the radiation in the wave band of from about 2.88 to 2.95 microns wave length is an optimum wave band or frequency range for measuring the thickness of water vapor in a layer 13. Incidentally the curve also illustrates what was previously noted concerning temperature and thickness of the water layer. As temperature increases, the water layer thickness decreases and results in a greater percent transmission of radiation. Thus the curves of FIGURE 3 illustrate that the percentage transmission of radiation varies as the thickness of the water layer varies. This is illustrated by the variation in the transmission since it is known that higher temperatures result in collection of thinner layers of water. Contrast curve 18 with curve 15. The curves also illustrate as noted that if the thickness of the water layer 13 is to be indicative of the water vapor concentration in the carrier gas, that the temperature should be maintained relatively constant. Variations in temperature result in rather wide variation in attenuation of the electromagnetic radiation. Finally the curves illustrate that radiation of a wave length of 2.93 microns is the optimum wave length for monitoring the thickness of the water layer 13 since it is highly attenuated.

The difference between using radiation to measure gas concentration when it is deposited in a layer on a substrate as opposed to the situation where the gas is measured when it is in a gaseous form in the carrier gas has effectively been demonstrated. In the case of water vapor, if the radiation is cast through the carrier gas and in a situation where no molecular or other layer is formed, a radiation of a wave length of 2.65 microns is the most usable or optimum radiation which will be absorbed or attenuated by the water vapor in the gaseous form. This wave length of radiation, 2.65 microns, is substantially different from the wave length in the band from 2.88 to 2.93 microns which is preferably used when a layer of the gas or a layer of water 13 is formed on a substrate 12.

Figure 6:
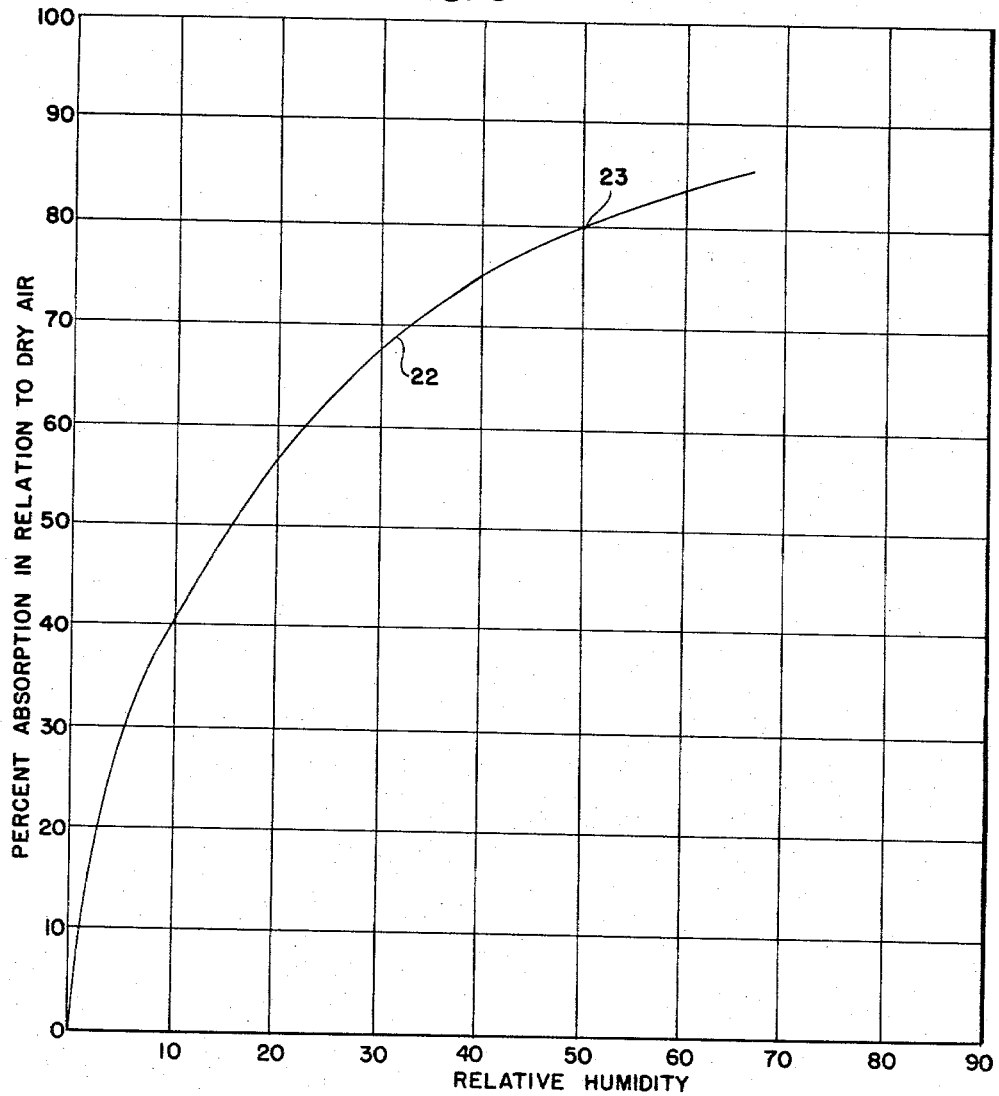

Refer now to FIGURE 6 which is a graph plotting absorption of radiation of a wave length of about 2.93 microns against relative humidity over a temperature range of +30° C. to −30° C. The absorption of radiation is expressed as a percentage of absorption in relation to dry air, that is, at zero relative humidity, no attenuation occurs. The curve 22 demonstrates that as the relative humidity increases, and consequently layer 13 of the cell 14 would become substantially thicker, the percentage of absorption of radiation increases. To select a particular example, if the relative humidity of the air passing the cell 14 is 50 percent, it is noted that the percentage absorption of radiation of 2.93 microns in relation to dry air is about 80 percent as demonstrated by point 23 on curve 22. The relation of attenuation of the radiation to relative humidity or concentration of water vapor is clearly illustrated.

Refer now to FIGURE 1 of the drawings where the cell 14 is shown situated within jacket 15. A source of electromagnetic radiation, such as infrared radiation, 24 in the case where water vapor is being analyzed, and a lens system illustrated by lens 26 for focusing the radiation is situated on one side of jacket 15 in a manner so that radiation from source 24 is cast upon window 27 of jacket 15. Window 27 is transparent to the particular band of radiation, from about 2.88 to 2.93 microns, which is being used to measure the thickness of the layer of water vapor 13. If radiation source 24 is properly selected it may be a source of nearly monochromatic radiation of the preferred wave band, in which case the radiation from source 24 can be cast directly upon cell 14. If, however, radiation source 24 transmits an uncontrolled band of frequencies or wave lengths, then a filter 28 may be interposed between window 27 and lens 26 to filter out all wave lengths of radiation except the preferred band wave lengths from about 2.88 to 2.95 microns.

On what is considered the back side of jacket 15 opposite filter 28 is a second lens 29 which focuses the radiation which is transmitted through the cell 14 and transparent window 25 onto the cathode 31 of a photocell 32 or similar radiation detection device. Lens 29 is used to focus the radiation from cell 14 onto the photocell 32 in order that an accurate indication of the transmitted radiant energy is obtained by utilizing the photocell 32. Photocell 32 may be of a variety which only responds to the preferred wave band of radiation or it may be shielded so that no light or radiation from sources other than source 24 is cast upon cathode 31.

The detection circuit generally designated by the numeral 33 contains a source of energy such as D.C. battery 34, a variable resistance 36 and an ammeter or galvanometer 37. The detection circuit 33 is calibrated by casting radiation from source 24 through the cell 14 before a layer of 13 of water vapor is collected on the substrate 12. Resistor 36 is adjusted so that the current flow through the ammeter 37 is at a null or known position. Carrier gas such as air from a particular environment such as a room is then pumped into the jacket 15 by pump 16.

Figure 5:
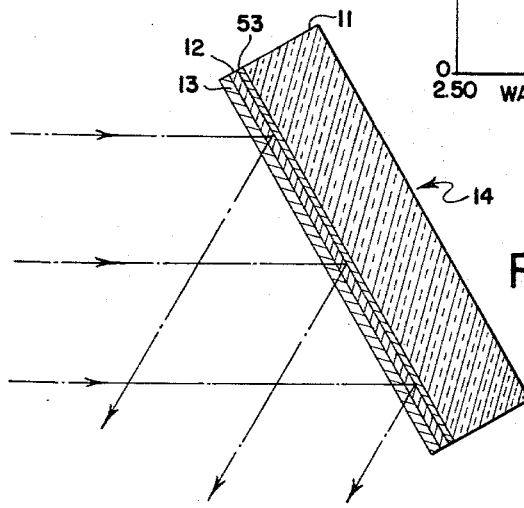
FIGURE 5 is an alternate embodiment of FIGURE 4 where the base material has a reflective surface between the substrate and the base material and FIGURE 6 is a graph plotting absorption of electromagnetic radiation of 2.93 microns wave length against relative humidity over a temperature range of +30° C. to −30° C.

The lithium chloride substrate 12 then collects a layer 13 of water vapor from the carrier gas which is indicative of the percentage or amount of water vapor contained in the carrier gas for air from the room. If the relative humidity of the carrier gas is constant, the thickness 13 increases until an equilibrium condition has been approached. The magnitude of the radiation of the preferred wave band which passes through layer 13 is then attenuated by the layer 13 in accordance with the relative humidity of the carrier gas. The thickness of the substrate layer 12 and the water vapor layer 13 are illustrated in FIGURES 4 and 5 as nearly equal in thickness, however the substrate 12 may be extremely thin in relation to layer 13 or it may be relatively thick in relation to layer 13. In any case, calibration of the apparatus eliminates the negligible attenuation of the radiation as a result of substrate 12.

The radiation which passes through layer 13 is then focused so that it falls upon cathode 31 of the photocell 32. This radiation which falls upon cathode 31 causes a conduction of current in the detection circuit 33 which is different from the calibrated condition of the detection circuit 33 wherein no layer 13 was collected on the substrate 12. This variation of current flow in the detection circuit 33 is detected by ammeter 37 and with a proper scale the ammeter 37 can be scaled to read in terms of relative humidity rather than amperes of current flow in the detection circuit 33.

Since the process of collecting a layer of water 13 on substrate 12 is reversible, if the percentage of water in the carrier gas diminishes, the thickness of water vapor layer 13 will also diminish. When the thickness of layer 13 reduces, the amount of radiation which passes through the cell 14 increases in direct proportion to the thickness of the layer. This increase in the transmission of radiation is detected by photocell 32 and results in anincrease in the current flow in detection circuit 33 and consequently the change in flow of current in the detection circuit 33 is indicated on ammeter 37. Thus it can be seen that any variation in the relative humidity of the carrier gas is immediately detected by the ammeter 37 of the detection circuit 33. Not only does the circuit provide a constant and sensitive indication of variations in the relative humidity or concentration of water vapor in a carrier gas, but experience has shown that the sensitivity is quite great. For instance, it has been determined that the sensitivity of this device is such that relative humidity readings of substantially less than one percent relative humidity are readily monitored by the device even when a standard water vapor collecting substrate 12 such as lithium chloride is utilized as the collector of the gas.

Refer now to FIGURE 2 of the drawings which illustrates a variation of the device in FIGURE 1. Instead of calibrating the detection circuit 33 against the situation where no layer 13 is formed on the cell 14, a second source of radiation of a frequency which is not absorbed or at least relatively unattenuated by the particular gas which is collected, may be utilized as a reference against which the absorbed frequency is compared. Where two frequencies are utilized, the radiation source 24 may be of the type which generates a band of frequencies. A second filter 38 is then utilized in conjunction with filter 28. All frequencies except the frequency which is to be absorbed and an adjacent frequency such as 2.50 microns which is relatively unabsorbed by the layer of water vapor on cell 14, are filtered out. If windows 25 and 27 as well as base material 11 are transparent to the attenuated as well as the unattenuated wave lengths of energy, then the energy will pass through the cell 14 and be directed upon a prism 39. As the radiation of the preferred wave band and 2.5 microns passes through the cell 14, the radiation of the preferred wave band is absorbed or attenuated in proportion to the thickness 13 of the water vapor layer on the substrate 12 whereas the radiation of 2.50 microns passes through relatively unattenuated. Prism 39 is utilized to separate the respective wave lengths of radiation so that they are individually directed upon a pair of lenses 41 and 42 which cast the separated beams of radiation upon a pair of photocells 43 and 44.

The photocells 43 and 44 are part of a Wheatstone bridge 46 which is used as a comparison circuit for comparing the relative magnitudes of detected energy in the 2.93 micron and 2.50 micron wave lengths. Battery 34 provides a potential source across points 49 and 51 of the Wheatstone bridge 46. A galvanometer is connected across points 47 and 48 of the bridge 46 and is utilized to provide an indication of any difference in potential developed across these points. Since the preferred wave band of radiation is attenuated by the layer of water vapor 13, the photocell which detects this wave length of energy does not generate as much current as the other photocell, consequently, an unbalance will exist on bridge 46 which is detected by the galvanometer 52. This unbalance of bridge 46 is a direct indication of the thickness of the water vapor layer 13 since the water vapor layer 13 attenuates the preferred wave band of radiation in accordance with the thickness. Effectively the comparison of the energy levels of the transmitted wave lengths of energy results in a factor or meter reading which is a function of the number of molecules of gas collected or sorbed (adsorbed or absorbed) on the substrate 12 and therefore the density of like molecules in the carrier gas. As with the apparatus described in FIGURE 1, this device continuously monitors the concentration of a gas in a carrier gas as the carrier gas is made to flow past the cell 14 in jacket 15.

A variation of the devices disclosed in FIGURES 1 and 2 may include a cell 14 which contains a reflective base material 11 or a base material 11 with a reflective material 53 over one surface of the base 11. If a reflective rather than a transparent base 11 is utilized, the configuration of FIGURES 1 and 2 may be altered so that the detection devices and in particular the detection circuit 33 may be placed in front of the jacket 15 in order that radiation from radiation source 24 enters window 27 and strikes the cell 14 and is reflected back through window 27 to a detection circuit which is on the same side of the jacket 15 as radiation source 24. FIGURE 5 illustrates a cell of the reflective type. Cell 14 may be slanted at a predetermined angle so that radiation penetrates layer 13 and substrate 12 and is reflected from a reflective surface 53 and travels back through substrate 12 and the water vapor layer 14 to the detection device. When the reflective type cell 14 is utilized, of course, the radiation from the radiation source 24 penetrates the water vapor layer 13 twice. In spite of the double penetration of the water vapor layer 13, the detection circuit 33 may be calibrated to take into account the dual penetration of the layers 12 and 13 so that an accurate reading of the thickness of layer 13 and consequently an indication of the concentration of water vapor in the carrier gas can be determined. This reflective-type cell 14 may be desirable if the environment into which the cell must be placed does not lend itself to inspection by utilizing penetrating radiation as in the FIGURES 1 and 2. An example of the situation where the reflective cell might be more usable is the situation where the atmosphere of a room must be monitored from outside the room. The cell 14 may be placed near a transparent window, such as 27, and the radiation can penetrate the transparent window 27 and detect the amount of water vapor collected by the substrate 12. The information or the radiation if reflected to the detection circuit 33 which is also outside the room. With this arrangement no separate exit window is needed for the radiation which is being used to inspect the thickness of layer 13.

As was previously noted the instant device has been explained in terms of collection and detection of water vapor in a carrier gas such as air, however the same principles may be applied and utilized in the detection and quantitative measurement of other gases which can be collected in a manner similar to that described for water vapor. Also the device can be altered to simultaneously measure the concentration of several gases which may be simultaneously collected on a cell such as cell 14.

It is to be understood that the above described arrangements are simply illustrative of the application of the principles of the invention. Numerous other arrangements may be readily devised by those skilled in the art which will enbody the principles of the invention and fall within the spirit and scope thereof.

Now therefore we claim:

1. An apparatus for measuring concentrations of a gas in a mixture of gases by measuring attenuation of electromagnetic radiation which comprises means for collecting a layer of said gas indicative of the concentration of said gas in said mixture of gases, an electromagnetic radiation source, means for directing electromagnetic radiation through said layer, and means for measuring the attenuation of said radiation by said layer.

2. An apparatus for quantitatively measuring a gas in a mixture of gases which comprises means for collecting a layer of said gas which is indicative of the concentration of said gas in said mixture, an electromagnetic radiation source, means for directing electromagnetic radiation from said source through said layer, means for directing a flow of said mixture past said means for collecting and means for measuring the attenuation of said radiation by said layer.

3. An apparatus for quantitatively measuring a gas in a mixture of gases by measuring attenuation of electromagnetic radiation which comprises means for collecting a layer of said gas in proportion to the concentration of said gas in said mixture, means for generating electromagnetic radiation of a predetermined frequency range, means for directing the radiation through said layer and means for measuring the attenuation of said radiation by said layer.

4. An apparatus in accordance with claim 3 in which said means for measuring includes a photocell and in which said means for generating includes a filter which passes radiation of a predetermined frequency range.

5. An apparatus for quantitatively measuring a gas in a mixture of gases which comprises a base transparent to a predetermined frequency of radiant energy; material on one surface of said base for collecting a layer of said gas; means for generating radiant energy of said predetermined frequency; means for directing said radiant energy through said layer, material, and base; and means for measuring the attenuation of said energy due to said layer.

6. An apparatus in accordance with claim 5 in which said material is LiCl, said gas is water vapor, and said predetermined frequency has a wave length of 2.93 microns.

7. An apparatus in accordance with claim 5 in which said means for generating includes a filter for passing energy of said predetermined frequency, said means for directing includes focusing lenses, and said means for measuring includes a photocell.

8. An apparatus for quantitatively measuring a gas in a mixture of gases as a function of attenuation of radiant energy which comprises a base which reflects a predetermined frequency of radiant energy, material on one surface of said base for collecting a layer of said gas, means for generating radiant energy of said predetermined frequency, means for directing said radiant energy through said layer and material, and means for measuring the attenuation of said radiant energy due to said layer as it is reflected from said base.

9. An apparatus for quantitatively measuring a gas in a mixture of gases as a function of attenuation of electromagnetic radiation which comprises a base, material on one surface of said base for collecting at least a molecular layer of said gas, means for producing electromagnetic radiation of a first frequency which is highly attenuated by said layer of gas and a second frequency which is not attenuated by said layer, means for directing said first and second frequencies of radiation through said layer and material, means for individually sensing said first and second frequencies of radiation and for generating signals proportional to the magnitude of the received radiation, and means for comparing said signals to indicate the attenuation of said first frequency.

10. A method of measuring the concentration of a gas in a mixture of gases which comprises passing said mixture in contact with a material which collects a layer of said gas which layer varies with the concentration of said gas in said mixture, directing radiation of a wave length which is attenuated in accordance with the thickness of said layer through said layer, and then measuring the attenuation of said radiation.

11. A method of measuring the concentration of a gas in a mixture of gases which comprises passing said mixture in contact with a material which collects a layer of said gas which varies in thickness in accordance with the concentration of said gas in said mixture, measuring the intensity of radiation of a predetermined wave length in the absence of said layer, directing said radiation through said layer, and then measuring the attenuation of said radiation relative to the unattenuated intensity of said radiation.

12. A method of measuring the concentration of a gas in a mixture of gases which comprises passing said mixture in contact with a material which collects a layer of said gas which varies in thickness with the concentration of said gas in said mixture, directing radiation of a predetermined intensity and of a first wave length which is not attenuated by said layer through said layer, directing radiation of said predetermined intensity and of a second wave length is attenuated by said layer in accordance with the thickness of said layer through said layer, and then detecting the attenuation of said second wave length of radiation relative to said first wave length.

13. A method of measuring the concentration of a gas in a mixture of gases which comprises placing a gas absorbent on a base, passing said mixture past said absorbent to collect a layer of said gas which varies in accordance with the concentration of said gas in said mixture, directing radiation of predetermined intensity and of a wave length which is attenuated by said layer in accordance with the thickness of said layer through said layer, and then measuring the attenuation of said radiation.

14. A method for determining the concentration of water vapor in air which comprises passing air past a layer of lithium chloride to collect a film of water which varies in accordance with the concentration of water vapor in the air, directing radiation of a wave length of 2.93 microns at a predetermined intensity through said film, and then measuring the attenuation of said radiation to determine the thickness of said film.

References Cited in the file of this patent
UNITED STATES PATENTS

| | | |
|---|---|---|
| 2,632,114 | Silvertooth | Mar. 17, 1953 |
| 2,810,835 | Miller | Oct. 22, 1957 |
| 2,918,578 | Friedman | Dec. 22, 1959 |